US006824719B2

(12) United States Patent
Weder et al.

(10) Patent No.: US 6,824,719 B2
(45) Date of Patent: Nov. 30, 2004

(54) METHOD FOR MAKING PRINTED AND/OR EMBOSSED DECORATIVE GRASS

(75) Inventors: Donald E. Weder, Highland, IL (US); Sonny K. Burnside, Highland, IL (US)

(73) Assignee: The Family Trust U/T/A 12/8/1995, Highland, IL (US)

(*) Notice: Subject to any disclaimer, the term of this patent is extended or adjusted under 35 U.S.C. 154(b) by 117 days.

(21) Appl. No.: 10/353,744

(22) Filed: Jan. 28, 2003

(65) Prior Publication Data

US 2003/0111761 A1 Jun. 19, 2003

Related U.S. Application Data

(60) Continuation of application No. 09/695,638, filed on Oct. 24, 2000, now abandoned, which is a division of application No. 09/288,186, filed on Apr. 8, 1999, now abandoned.
(60) Provisional application No. 60/081,370, filed on Apr. 10, 1998.

(51) Int. Cl.[7] .............................................. B29C 67/00
(52) U.S. Cl. ....................... 264/132; 264/146; 264/148; 264/160
(58) Field of Search ................................ 264/132, 146, 264/147, 148, 160

(56) References Cited

U.S. PATENT DOCUMENTS

| | | | | |
|---|---|---|---|---|
| 2,016,334 A | 10/1935 | McComb | | |
| 2,244,845 A | 6/1941 | Matthews | | |
| 2,336,100 A | 12/1943 | Jacque | | |
| 2,399,744 A | 5/1946 | Kaphan | | |
| 2,679,887 A | 6/1954 | Doyle et al. | | |
| 3,398,434 A | 8/1968 | Alesi, Jr. et al. | | |
| 3,416,991 A | 12/1968 | Yoshimura | | |
| 3,459,845 A | 8/1969 | Hebeler | 264/168 | |
| 3,558,580 A | 1/1971 | Orser | 260/88.2 | |
| 3,650,877 A | 3/1972 | Johnson | 161/47 | |
| 3,673,056 A | 6/1972 | Nadler | 161/62 | |
| 3,803,284 A | 4/1974 | Burghardt et al. | 264/130 | |
| 3,869,533 A | 3/1975 | Jonocha et al. | 264/146 | |
| 3,898,177 A | 8/1975 | Taylor | 156/163 | |
| 3,933,959 A | 1/1976 | Skochdopole et al. | 264/45.5 | |
| 4,045,949 A | 9/1977 | Paton et al. | 57/140 | |
| 4,199,627 A | 4/1980 | Weder et al. | 428/7 | |
| 4,255,487 A | 3/1981 | Sanders | 428/368 | |
| 4,401,700 A | 8/1983 | Weder et al. | 428/17 | |
| 4,496,614 A | 1/1985 | Weder et al. | 428/7 | |
| 4,549,908 A | 10/1985 | Weder et al. | 106/266 | |
| 4,735,669 A | 4/1988 | Guida et al. | 156/229 | |
| 5,088,972 A | 2/1992 | Parker | 493/352 | |
| 5,134,013 A | 7/1992 | Parker | 428/182 | |
| 5,147,706 A | 9/1992 | Kingman | | |
| 5,173,352 A | 12/1992 | Parker | 428/174 | |
| 5,388,386 A | 2/1995 | Weder | 53/397 | |
| 5,403,259 A | 4/1995 | Parker | 493/352 | |
| 5,448,875 A | 9/1995 | Weder | 53/397 | |
| D368,654 S | 4/1996 | Santoiemmo et al. | D9/415 | |
| 5,573,491 A | 11/1996 | Parker | 193/352 | |
| 5,656,008 A | 8/1997 | Beierlorzer | 493/346 | |
| 5,712,020 A | 1/1998 | Parker | 428/182 | |
| 5,752,360 A | 5/1998 | Weder | 53/397 | |
| 5,871,432 A | 2/1999 | Beierlorzer | 493/352 | |
| 5,899,144 A | 5/1999 | Parks | | |
| 5,906,280 A | 5/1999 | Weder | | |
| 5,906,569 A | 5/1999 | Miyamoto et al. | 29/564.1 | |
| 5,921,907 A | 7/1999 | Beierlorzer | 493/357 | |
| 6,258,447 B1 | 7/2001 | Weder et al. | 428/195.1 | * |

* cited by examiner

*Primary Examiner*—Edmund H. Lee
(74) *Attorney, Agent, or Firm*—Dunlap, Codding & Rogers, P.C.

(57) ABSTRACT

Method for producing decorative grass, such as Easter grass, from a sheet or web of material having printed material and/or embossed patterns thereon. The printed material and embossed patterns may be in register or out of register with one another. A method for producing decorative grass having the appearance of a blend of decorative grasses is also disclosed.

8 Claims, 4 Drawing Sheets

METHOD FOR MAKING PRINTED AND/OR EMBOSSED DECORATIVE GRASS

CROSS REFERENCE TO RELATED APPLICATIONS

This application is a continuation of U.S. Ser. No. 09/695,638, filed Oct. 24, 2000, now abandoned; which is a divisional of U.S. Ser. No. 09/288,186, filed Apr. 8, 1999, now abandoned; which claims benefit of provisional application U.S. Ser. No. 60/081,370, filed Apr. 10, 1998.

STATEMENT REGARDING FEDERALLY SPONSORED RESEARCH

Not applicable.

FIELD OF THE INVENTION

The present invention relates generally to decorative grass and methods for making same, and more particularly, but not by way of limitation, to a decorative grass having printed matter thereon and to a method for producing same. In one aspect, the present invention relates to a decorative grass having an embossed pattern thereon and to a method for producing same. In yet another aspect, the present invention relates to a decorative grass having an embossed pattern and printed matter thereon and to a method for producing same.

BRIEF DESCRIPTION OF PRIOR ART

Decorative grass has been used for many years in Easter baskets and for other decorative purposes. The decorative grass of the prior art has been produced by numerous methods and from a variety of materials such as plastic materials, paper, cellophane or the like. Typically, such materials are cut and shredded to produce segments having predetermined dimensions. One such prior art method for making decorative grass is disclosed in U.S. Pat. No. 4,292,266, issued to Weder et al., wherein a plastic film is extruded and cut into plastic strips which are passed through a slow-speed godet, an oven and a high-speed godet so that the strips are drawn down in width and thickness without breaking. From the high-speed godet, the strips or strands are chopped to a desired length and conveyed to a storage area for subsequent bagging and packaging.

While the prior art methods for making decorative grass have been widely accepted, new and improved methods for making decorative grass having improved aesthetic qualities are being sought which are less costly and wherein the decorative grass has an improved feel. It is to such a decorative grass and method for producing same that the present invention is directed.

SUMMARY OF THE INVENTION

The present invention relates to a decorative grass having improved aesthetic qualities and to methods for making such decorative grass. In one embodiment, decorative grass is produced by providing a flexible sheet or web of material, printing the sheet of material to provide the printed sheet of material containing printed material and/or printed patterns on at least one side thereof, slitting the printed sheet of material to provide a web of flexible strips wherein at least a major portion of the strips have printed material and/or printed patterns on at least one side thereof, and thereafter chopping the flexible strips into segments having a predetermined length to produce a decorative grass having printed material and/or printed patterns on at least one side thereof.

In another embodiment, decorative grass is produced by providing a flexible sheet or web of material, printing at least one surface of the sheet of material with a plurality of different colored inks, slitting the printed sheet of material to provide a web of flexible strips, and thereafter chopping the flexible strips into segments having a predetermined length to produce decorative grass having a plurality of different colored segments and thereby provide the decorative grass with an appearance of a blend of different colors of decorative grass.

In another embodiment, decorative grass is produced by providing a flexible sheet or web of material, embossing the sheet of material to provide the sheet of material with an embossed pattern, slitting the sheet of material having an embossed pattern to provide a web of flexible strips wherein at least a major portion of the strips have an embossed pattern, and thereafter chopping the flexible strips into segments having a predetermined length to produce a decorative grass having an embossed pattern.

In yet another embodiment, decorative grass is produced by providing a flexible sheet or web of material, embossing the sheet of material to provide an embossed pattern thereon and printing the embossed sheet of material to provide embossed, printed sheet of material, slitting the embossed, printed sheet of material to provide a web of flexible strips wherein at least a major portion of the strips have an embossed pattern and printed material, and thereafter chopping the flexible strips into segments having a predetermined length to produce a decorative grass having an embossed pattern and printed material and/or designs.

An object of the present invention is to provide a decorative grass having improved aesthetic qualities.

Another object of the present invention is to provide a method for producing a decorative grass having improved aesthetic qualities and feel which is cost effective.

Other objects, features and advantages of the present invention will become apparent from the following detailed description when read in conjunction with the accompanying drawings and appended claims.

DETAILED DESCRIPTION OF PREFERRED EMBODIMENTS

Figure 1:
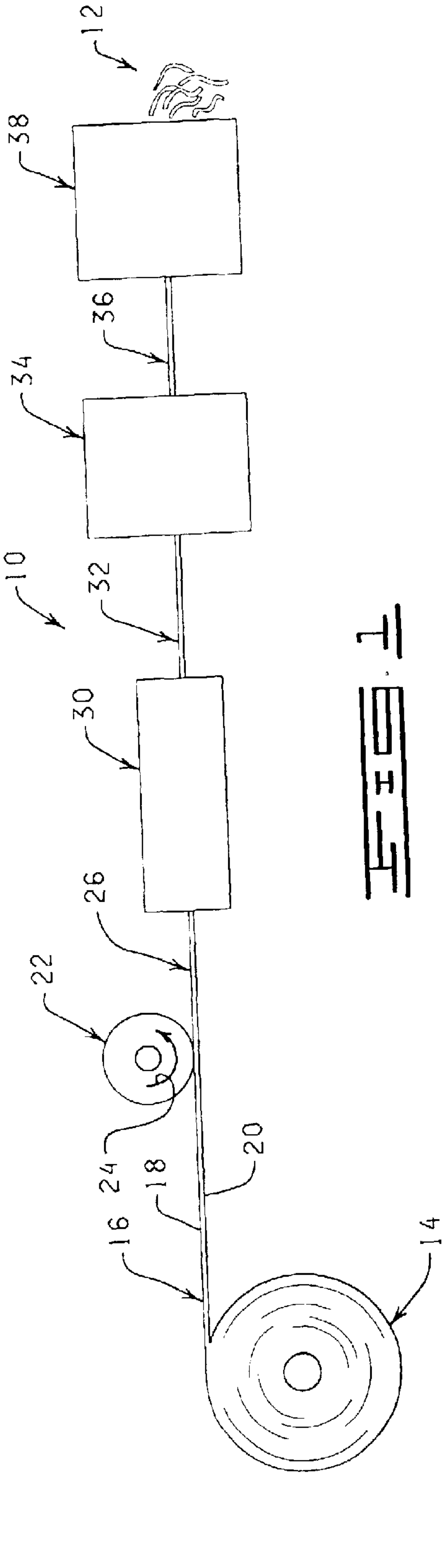
FIG. 1 is a schematic representation of a system for making a decorative grass having printed material and/or printed designs on at least one side thereof in accordance with the present invention.
Figure 2A:
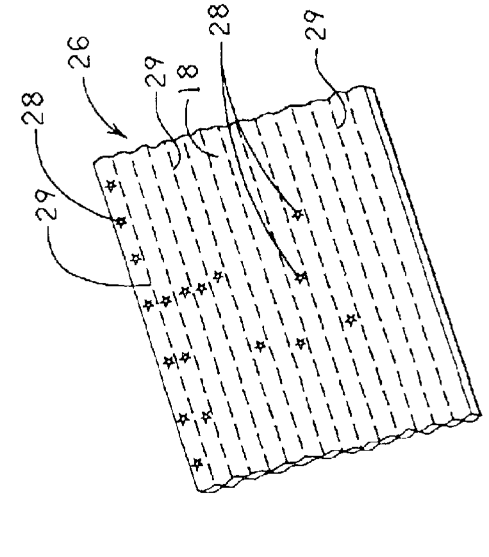
FIG. 2A is a perspective view of one embodiment of a sheet of printed material for producing decorative grass having printed material on at least one side thereof constructed in accordance with the present invention.
Figure 3A:
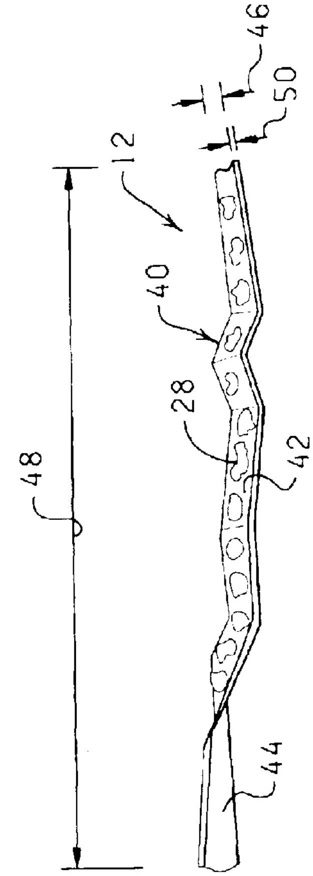
FIG. 3A is a perspective view of a segment of decorative grass constructed from the sheet of printed material of FIG. 2A.

Referring now to the drawings, FIG. 1 illustrates schematically a system 10 for making a decorative grass 12 having printed matter on at least one side thereof in accordance with the present invention. A roll of material 14 consisting of a flexible sheet or web of material 16 having a first or upper surface 18 and a second or lower surface 20 is rollingly supported so that the sheet of material 16 is passed by an ink roller 22 which is rotated in the direction indicated by the arrow 24 so that ink is applied to selected portions of the upper surface 18 of the sheet of material 16 to provide a printed sheet of material 26 having a printed design and/or printed material 28 on the upper surface 18 thereof (FIG. 2A), such as a star, a flower design, an animal design and the like, or a special occasion slogan, i.e., happy birthday, an anniversary, Merry Christmas, Happy Mother's Day and the like, or a combination of a printed design and a printed material. The printed design and/or printed material 28 can be selectively printed on the upper surface 18 of the sheet of material 16 by application of ink to the upper surface 18 of the sheet of material 16 (FIG. 2A) so that when the sheet of material 26 is slit (such as along dashed lines 29) and cut into segments to form the decorative grass 12, each segment of the decorative grass 12 contains the printed material and/or printed designs 28 which are confined within the boundaries of the segments of decorative grass 12 substantially as shown in FIG. 3A.

As an alternative, a printed design and/or printed material **28*a* can be randomly printed on an upper surface 18*a* of a sheet of material by application of ink to provide a printed sheet of material 26*a* (FIG. 2B) so that, when the sheet of printed material 26*a* is slit (such as along dashed lines 29*a*) and cut into segments to form the decorative grass 12*a*, each segment of the decorative grass 12*a* contains at least a portion of the printed design and/or printed material 28*a* substantially as shown in FIG. 3**B.

Figure 2C:
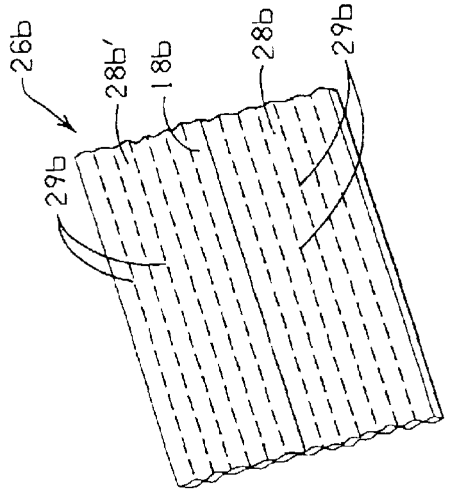
FIG. 2C is a perspective view of another embodiment of printed material for producing decorative grass having the appearance of a blend of decorative grasses having different colors.
Figure 2B:
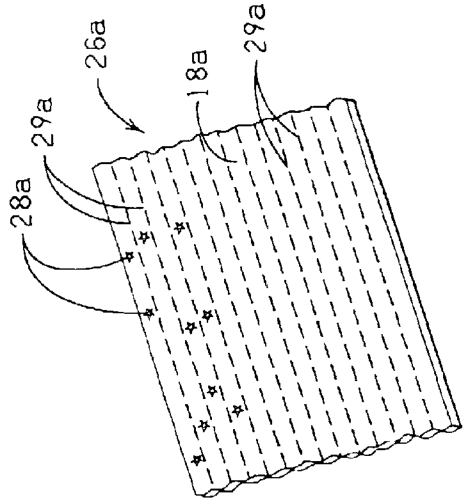
FIG. 2B is a perspective view of another embodiment of printed material for producing decorative grass having printed material on at least one side thereof constructed in accordance with the present invention.

A printed sheet of material **26*b* containing a plurality of colors can be produced by the application of various colored inks to an upper surface 18*b* of a sheet of material, such as a red ink and a green ink indicated by the numerals 28*b* and 28*b*' in FIG. 2C. Thus, when a sheet of printed material 26*b* is slit (such as along dashed lines 29*b*) and cut into segments of a decorative grass 12*b*, a portion of the segments will be red on at least an upper surface thereof and a portion of the segments will be green on at least an upper surface thereof which provides the decorative grass 12*b* with the appearance of a blended decorative grass 12*b* containing red colored segments and green colored segments substantially as shown in FIG. 3**C.

It should be understood that while the ink roller 22 has been illustrated as being positioned so as to apply ink to the upper surface 18 of the sheet of material 16, the ink roller 22 can be positioned so as to apply ink to the lower surface 20 of the sheet of material 16 or two or more ink rollers 22 can be employed to apply ink to either the upper surface 18 of the sheet of material 16 or to the lower surface 20 of the sheet of material 16, or to apply ink to the upper and lower surfaces 18 and 20 of the sheet of material 16. Further, when employing two or more of the ink rollers 22 to apply ink to the sheet of material 16, different colors of ink can be applied to either the upper surface 18 of the sheet of material 16, or to the lower surface 20 of the sheet of material 16, or to the upper and lower surfaces 18 and 20 of the sheet of material 16.

The sheets or webs of material employed to provide the printed sheets of material 26, **26*a* and 26*b* from which the decorative grasses 12, 12*a* and 12*b* herein before described are produced are substantially identical in construction, as are the systems for making decorative grasses from such printed sheets of material. Thus, only the sheet of material 16 and the system 10 for producing the decorative grass 12 will be described in detail herein after with reference to FIG. 1**.

The sheet of material 16 can be constructed of any suitable material capable of having ink affixed thereto so that the printed design and/or printed material 28 can be printed on the sheet of material 16 to produce the sheet of printed material 26. Illustrative of materials which can be employed as the sheet of material 16 are polymeric film, paper, foil, iridescent materials, optical effect materials and combinations thereof, such as laminated materials.

When the sheet of material 16 is a laminated material and only one surface of the sheet of material 16 is to be printed to produce the sheet of printed material 26, only the side being printed with the printed design and/or printed material must be capable of having the ink affixed thereto.

When the sheet of material 16 is a polymeric film, a flexible sheet of liquified thermoplastic film can be extruded from an extruder in a conventional and well known manner. The flexible sheet of liquified thermoplastic film can then be passed through a cooler which cools the liquified thermoplastic film into a sheet of solidified thermoplastic film, i.e. the sheet of material 16. The sheet of solidified thermoplastic film is then printed in the manner herein before discussed to provide the printed sheet of material 26.

The printed sheet of material 26 is then passed through a drier 30 to produce a dried printed sheet of material 32. The dried printed sheet of material 32 is then passed through a slitter 34, which slits or cuts the dried printed sheet of material 32 into strips or strands of desired width to produce a slitted web 36. The slitted web 36 is then passed into a chopper unit 38 where the slitted web 36 is chopped into segments to produce the decorative grass 12 (FIGS. 1 and 3A) having a predetermined length and which has the desired printed material 28 thereon.

When employing a sheet of solidified thermoplastic film to produce the printed sheet of material 26, and depending on the ink pattern applied to the sheet of material 16, it may be desirable after passing the printed sheet of material 26 through the slitter 34, and prior to passage of the slitted web 36 into the chopper unit 38, to heat the slitted web 36 in order to soften the strips or stands of the slitted web 36 so that the strips or strands of the slitted web 36 can be drawn down to provide the strips or strands of the slitted web 36 with a desired width and thickness as described in U.S. Pat. No. 4,292,266 which is herein specifically incorporated by reference.

The decorative grasses 12 produced by passing the slitted web 36 through the chopper unit 38 can then be conveyed to a storage area (not shown) which may be in the form of a suitable bin, conveyed to a packaging machine or to a baling machine for baling prior to storage. As other alternatives, the decorative grasses 12 may be placed into boxes or cartons, subjected to further processing immediately or held for subsequent processing.

Referring now to FIG. 3A, a segment 40 of the decorative grass 12 is illustrated. The segment 40 of the decorative grass 12 is provided with an upper surface 42 having the printed design and/or printed material 28 thereon and a lower surface 44. The segment 40 has a width 46 and a length 48 which define the boundaries of the segment 40; and the printed design and/or printed material 28 is confined within the boundaries of the segment 40 of the decorative grass 12. The width 46 and length 48 of the segment 40 are determined by the processing conditions of the system 10, i.e. the operational parameters of the slitter 34 and the chopper unit 38. The width 46 and length 48, as well as thickness 50 of the segment 40 can vary widely and will generally be dependent on the requirements of individual consumers. For most uses, however, the segment 40 will have a width 46 of from about 0.020 inches to about 0.125 inches, a length 48 of from about 2 inches through 24 inches and a thickness 50 of from about 0.0005 inches to about 0.0030 inches.

The segments of the decorative grass 12, such as the segment 40, can be produced clear or in almost any color required and the colors can be transparent or opaque, including but not exclusively red, green, yellow, pink, orchid, and blue.

Figure 3B:
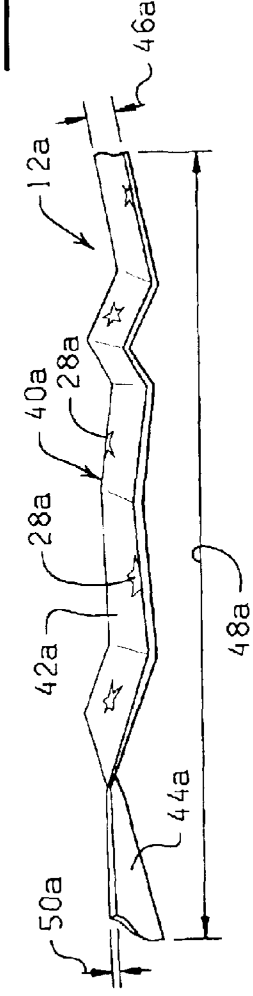
FIG. 3B is a perspective view of a segment of decorative grass constructed from the sheet of printed material of FIG. 2B.

Referring now to FIG. 3B, another embodiment of a segment 40*a* of a decorative grass 12*a* is illustrated. The segment 40*a* of the decorative grass 12*a* is provided with an upper surface 42*a* and a lower surface 44*a*. The upper surface 42*a* is provided with randomly positioned printed designs and/or printed materials 28*a*. The segment 40*a* has a width 46*a* and a length 48*a* which define the boundaries of the segment 40*a*; and only portions of at least a portion of the printed design and/or printed material 28*a* are confined within the boundaries of the segment 40*a* of the decorative grass 12*a*. The width 46*a*, length 48*a* and thickness 50*a* of the segment 40*a* are determined by the processing conditions; and can vary widely. For most uses, however, the segment 40*a* will have a width 46*a* of from about 0.020 inches to about 0.125 inches, a length 48*a* of from about 2 inches through 24 inches and a thickness 50*a* of from about 0.0005 inches to about 0.0030 inches.

The segments of the decorative grass 12*a*, such as the segment 40*a*, can be produced clear or in almost any color required and the colors can be transparent or opaque including but not exclusively red, green, yellow, pink, orchid and blue.

Figure 3C:
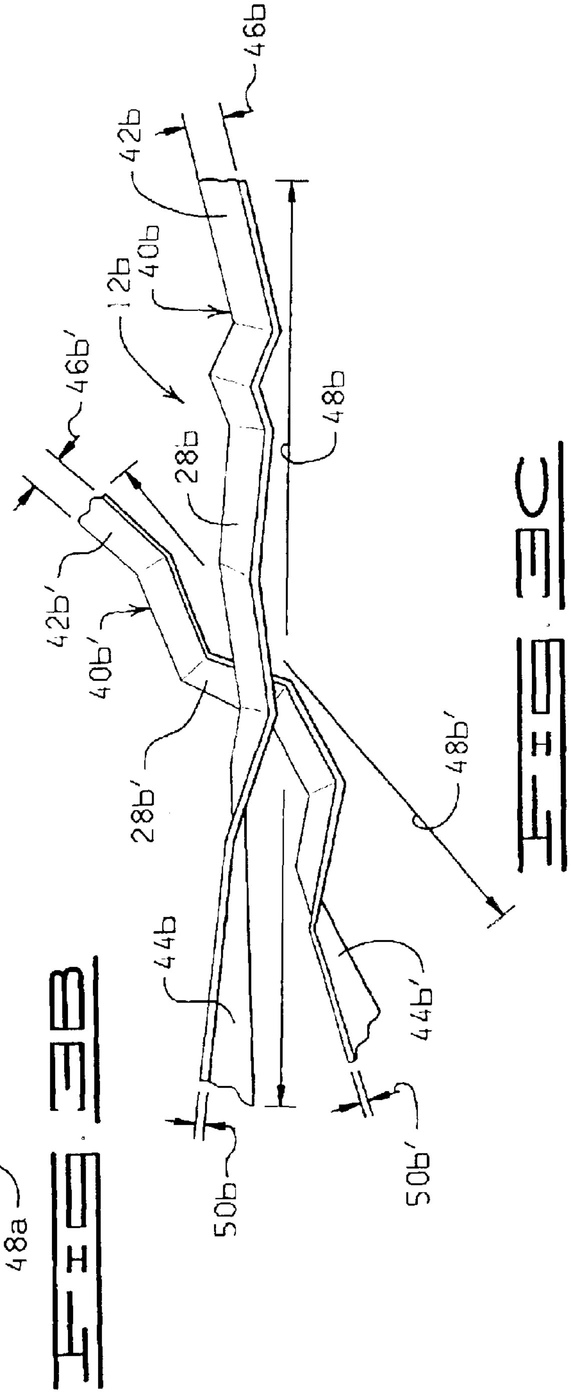
FIG. 3C is a perspective view a plurality of segments of a decorative grass constructed from the sheet of printed material of FIG. 2C wherein the segments of the decorative grass are of a different color to provide the appearance of a blend of decorative grasses.

Referring now to FIG. 3C, a plurality of segments of a decorative grass 12*b* are illustrated, such as segments 40*b* and 40*b*'. The segments 40*b* and 40*b*' are produced in the same manner as the segment 40 of the decorative grass 12 hereinbefore described with reference to FIG. 1, with the exception that, in the production of the printed sheet of material 26*b* (FIG. 2C), two or more ink rollers are employed which apply different colors of ink on the upper surface and/or lower surfaces 18*b* and 20*b* of a sheet or web of material to provide the printed sheet of material 26*b* illustrated in FIG. 2B. Thus, upon processing the printed sheet of material 26*b*, colored segments of decorative grass 12*b* having different colors, such as the segments 40*b* and 40*b*', are produced which cooperate to provided the decorative grass 12*b* with an appearance simulating blended segments of decorative grass. Thus, in a single production run, a blend-appearing decorative grass 12*b* having segments of different colors, such as the decorative grass 12*b* containing different segments 40*b* and 40*b*' can be produced.

The segment 40*b* has a colored upper surface 42*b* and a lower surface 44*b*; and the segment 40*b* has a width 46*b* and a length 48*b*, each of which are determined by the processing conditions employed in the production of the decorative grass 12*b*. Similarly, the segment 40*b*' has a colored upper surface 42*b*' and a lower surface 44*b*'; and the segment 40*b*' has a width 46*b*' and a length 48*b*', each of which are determined by the processing conditions of the system 10, i.e. the operational parameters of the slitter 34 and the chopper unit 38. The colored upper surface 42*b* of the segment 40*b* is a different color than the colored upper surface 42*b*' of the segment 40*b*' so that decorative grass 12*b* containing a plurality of the segments 42*b* and 42*b*' has the appearance of a blended decorative grass.

The widths 46*b* and 46*b*', the lengths 48*b* and 48*b*' and thicknesses 50*b* and 50*b*', respectively, of the segments 40*b* and 40*b*' can vary widely and will generally be dependent on the requirements of individual consumers. For most uses, however, the segments 40*b* and 40*b*' will have a width 46*b* or 46*b*' of from about 0.020 inches to about 0.125 inches, a length 48*b* or 48*b*' of from about 2 inches through 24 inches and a thickness 50*b* or 50*b*' of from about 0.0005 inches to about 0.0030 inches.

The segments 40*b* and 40*b*' of the decorative grass 12*b* can be produced in almost any color and the colors can be transparent or opaque including but not exclusively red, green, yellow, pink, orchid and blue.

Figure 4:
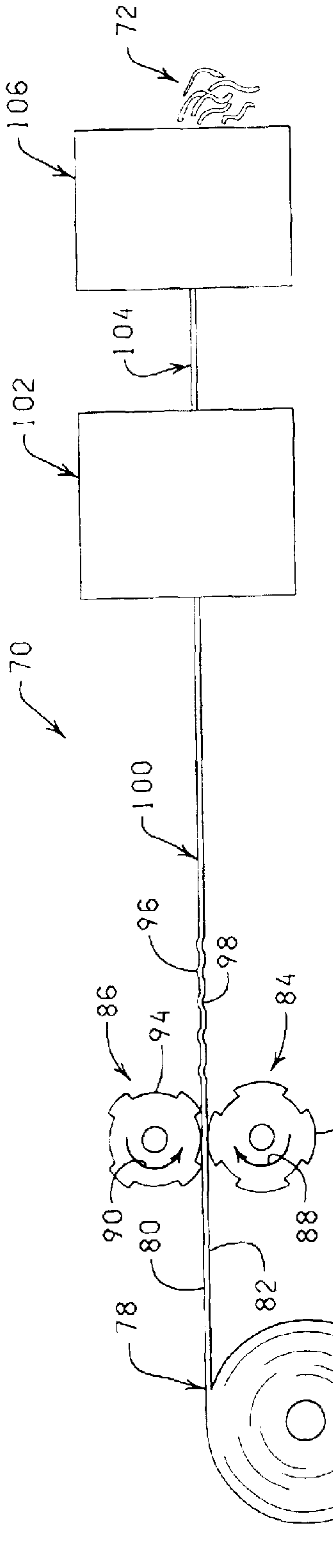
FIG. 4 is a schematic representation of a system for making a decorative grass having an embossed pattern in accordance with the present invention.
Figure 5:
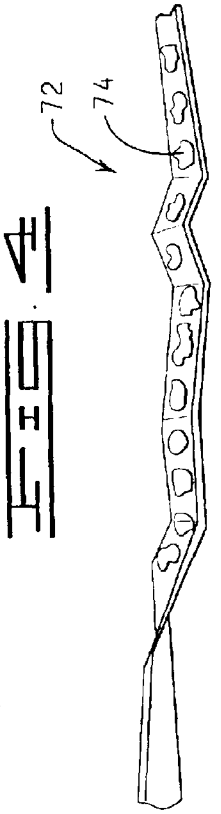
FIG. 5 is a perspective view of a decorative grass having an embossed pattern constructed in accordance with the present invention.

Referring now to FIG. 4, a system 70 for making a decorative grass 72 having an embossed pattern 74 (FIG. 5) in accordance with the present invention is schematically illustrated. A roll of material 76 (which consists of a flexible sheet or web of material 78 having a first or upper surface 80 and a second or lower surface 82) is rollingly supported so that the sheet of material 78 is passed between embossing rollers 84 and 86 which are rotated in the direction indicated by the arrows 88 and 90, respectively. The embossing roller 84 has a plurality of raised portions 92 (only one of the raised portions 92 being designated by the reference numeral in FIG. 4); and the embossing roller 86 has a plurality of depressed portions 94 (only one of the depressed portions 94 being designated by the reference numeral in FIG. 4). The depressed portions 94 are arranged on the embossing roller 86 to correspond and register with the raised portions 92 on the embossing roller 84. Thus, as the sheet of material 78 is passed between the embossing rollers 84 and 86, the raised portions 92 of the embossing roller 84 engage the sheet of material 78 and force the sheet of material 78 into the corresponding depressed portions 94 of the embossing roller

86 thereby forming raised portions 96 and depressed portions 98 in the sheet of material 78 as depicted in FIG. 4. That is, passage of the sheet of material 78 between the embossing rollers 84 and 86 produces an embossed sheet of material 100.

The embossed sheet of material 100 is then passed through a slitter 102, which slits or cuts the embossed sheet of material 100 into strips or strands of desired width to produce a slitted web 104. The slitted web 104 is then passed into a chopper unit 106 where the slitted web 104 is chopped to produce the embossed decorative grass 72 (FIG. 5) having a predetermined length and width.

The embossed decorative grass 72 produced by passing the slitted web 104 through the chopper unit 106 can then be conveyed to a storage area (not shown) which may be in the form of a suitable bin, conveyed to a packaging machine or to a baling machine for baling prior to storage. As other alternatives, the embossed decorative grass 72 may be placed into boxes or cartons, subjected to further processing immediately or held for subsequent processing.

The sheet of material 78 can constructed of any suitable material capable of being embossed. Illustrative of material which can be employed as the sheet of material 78 are polymeric film, paper, foil, iridescent materials, optical effect materials and combinations thereof, such as laminated materials.

Figure 6:
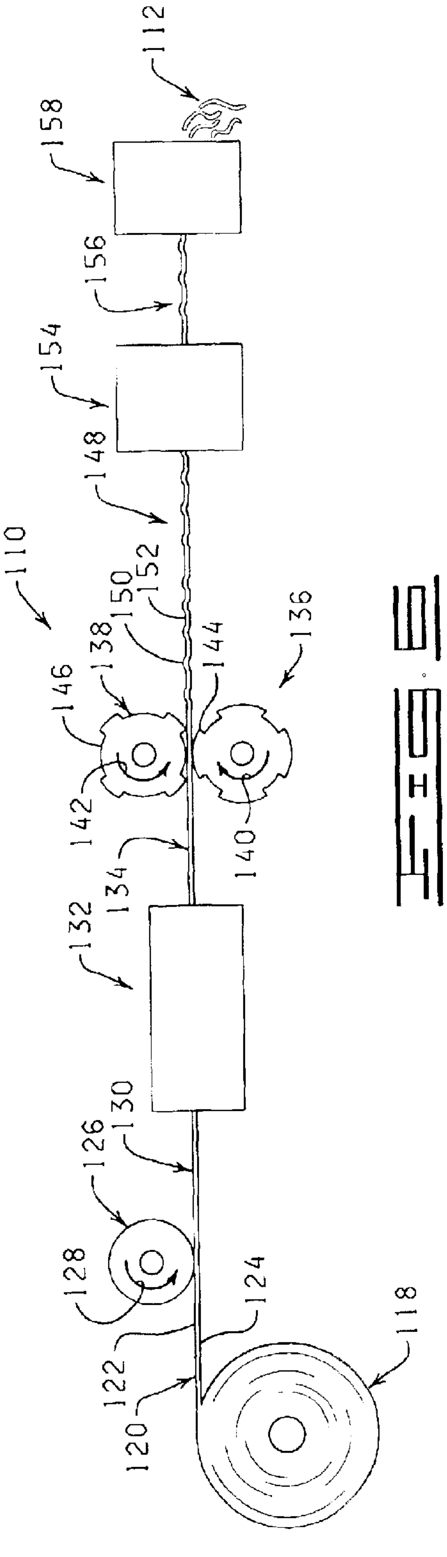
FIG. 6 is a schematic representation of a system for making a decorative grass having an embossed pattern and printed material thereon in accordance with the present invention wherein the printed material is out of registry with the embossed pattern.

Referring now to FIG. 6, a system 110 for making a decorative grass 112 having an embossed pattern 114 and a printed design and/or printed material 116 (FIG. 7) in accordance with the present invention is schematically illustrated wherein the printed material 116 is out of registry with the embossed pattern 114. A roll of material 118 consisting of a flexible sheet of material 120 having a first or upper surface 122 and a second or lower surface 124 is rollingly supported so that the sheet of material 120 is passed by an ink roller 126 which is rotated in the direction indicated by the arrow 128 so that ink is applied to selected portions of the upper surface 122 of the sheet of material 120 to provide a printed sheet of material 130 having the printed material 116 on the upper surface 122 thereof. The printed material 116 can be a printed design and/or printed material such as a star, a flower, an animal and the like, or a special occasion slogan, i.e., happy birthday, an anniversary, Merry Christmas, Happy Mother's Day and the like, or a combination of a printed design and a special occasion slogan.

It should be understood that while the ink roller 126 has been illustrated as being positioned so as to apply ink to the upper surface 122 of the sheet of material 120, the ink roller 126 can be positioned so as to apply ink to the lower surface 124 of the sheet of material 120 or two or more ink rollers 126 can be employed to apply ink to either the upper surface 122 of the sheet of material 120 or to the lower surface 124 of the sheet of material 120, or to apply ink to the upper and lower surfaces 122 and 124 of the sheet of material 120. Further, when employing two of more of the ink rollers 126 to apply ink to the sheet of material 120, different colors of ink can be applied to either the upper surface 122 of the sheet of material 120, or to the lower surface 124 of the sheet of material 120, or to the upper and lower surfaces 122 and 124 of the sheet of material 120.

The printed sheet of material 130 is then passed through a drier 132 to dry and affix the ink and thereby produce a dried printed sheet of material 134. The dried printed sheet of material 134 is then passed between embossing rollers 136 and 138 which are rotated in the direction indicated by the arrows 140 and 142, respectively. The embossing roller 136 has a plurality of raised portions 144 (only one of the raised portions 144 being designated by the reference numeral in FIG. 6); and the embossing roller 138 has a plurality of depressed portions 146 (only one of the depressed portions 146 being designated by the reference numeral in FIG. 6). The depressed portions 146 are arranged on the embossing roller 138 to correspond and register with the raised portions 144 on the embossing roller 136. Thus, as the dried printed sheet of material 134 is passed between the embossing rollers 136 and 138, the raised portions 144 of the embossing roller 136 engage the dried printed sheet of material 134 and force the dried printed sheet of material 134 into the corresponding depressed portions 146 of the embossing roller 138 thereby forming a sheet of printed and embossed material 148 having raised portions 150 and depressed portions 152.

The printed and embossed sheet of material 148 is then passed through a slitter 154, which slits or cuts the printed and embossed sheet of material 148 into strips or strands of desired width to produce a slitted web 156. The slitted web 156 is then passed into a chopper unit 158 where the slitted web 156 is chopped to produce the decorative grass 112 (FIG. 7) having the embossed pattern 114, the printed material or pattern 116 and a predetermined length and width.

The decorative grass 112 produced by passing the slitted web 156 through the chopper unit 158 can then be conveyed to a storage area (not shown) which may be in the form of a suitable bin, conveyed to a packaging machine or to a baling machine for baling prior to storage. As other alternatives, the decorative grass 112 may be placed into boxes or cartons, subjected to further processing immediately or held for subsequent processing.

The sheet of material 120 can constructed of any suitable material capable of being printed and embossed. Illustrative of material which can be employed as the sheet of material 120 are polymeric film, paper, foil, iridescent materials, optical effect materials and combinations thereof, such as laminated materials.

When the sheet of material 120 is a laminated material and only one surface of the sheet of material 120 is to be printed to produce the sheet of printed material 130, only the side being printed with the printed design and/or printed material must be capable of having the ink affixed thereto.

When the sheet of material 120 is a polymeric film, a flexible sheet of liquified thermoplastic film can be extruded from an extruder in a conventional and well known manner. The flexible sheet of liquified thermoplastic film can then be passed through a cooler which cools the liquified thermoplastic film into a sheet of solidified thermoplastic film, i.e. the sheet of material 120. The sheet of solidified thermoplastic film is then printed and embossed in the manner herein before discussed to provide the printed and embossed sheet of material 148.

Figures 7, 8, 9:
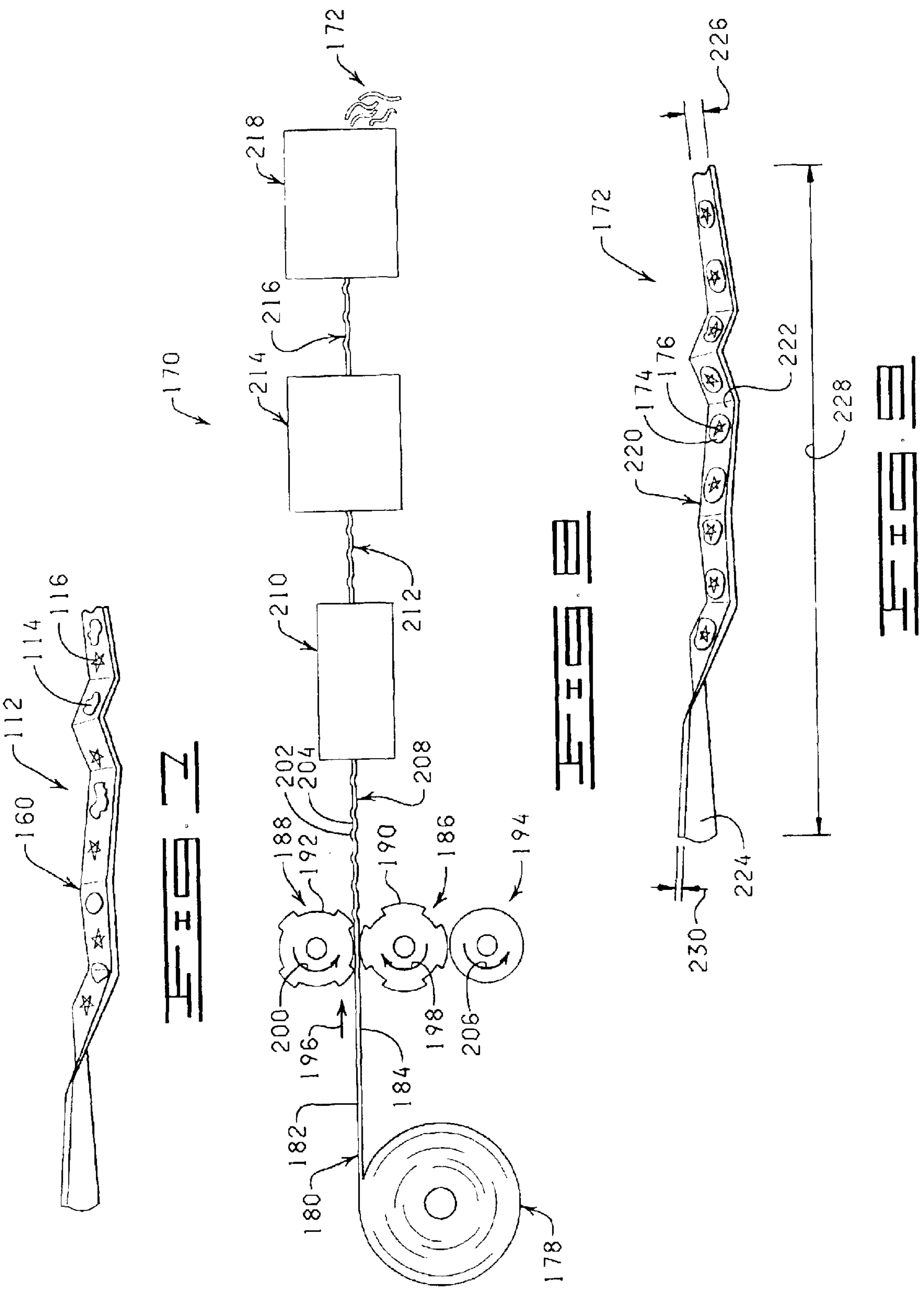
FIG. 7 is a perspective view of a segment of a decorative grass having an embossed pattern and printed material thereon constructed in accordance with the present invention wherein the printed material is out of registry with the embossed pattern.
FIG. 8 is a schematic representation of a system for making a decorative grass having an embossed pattern and printed material thereon in accordance with the present invention wherein the printed material is in registry with the embossed pattern.
FIG. 9 is a perspective view of a segment of a decorative grass having an embossed pattern and printed material thereon constructed in accordance with the present invention wherein the printed material is in registry with the embossed pattern.

FIG. 7 is a perspective view of a segment 160 of the decorative grass 112 having the embossed pattern 114 and printed material 116 thereon constructed in accordance with the present invention wherein the printed material 116 is out of registry with the embossed pattern 114. The term "out of registry" as used herein is to be understood to mean that the embossed pattern or a portion of the embossed pattern is arbitrarily positioned with respect to the printed material on the segments of the decorative grass 112 such as is illustrated in FIG. 7. That is, the embossed pattern 114 produced by embossing the dried printed sheet of material 134 is randomly positioned on the dried printed sheet of material 134 relative to the printed material 116. Thus, when the printed and embossed sheet of material 148 is slit and chopped into segments 160 of the decorative grass 112, the embossed pattern 114 is randomly positioned on the segments 160 of the decorative grass 112 relative to the printed material 116 thereon.

FIG. 8 illustrates schematically another system 170 for producing a decorative grass 172 having an embossed pattern 174 and printed material or pattern 176 (FIG. 9) in accordance with the present invention wherein the printed material 176 is in registry with the embossed pattern 174. A roll of material 178 consisting of a flexible sheet or web of material 180 having a first or upper surface 182 and a second or lower surface 184 is rollingly supported so that the sheet of material 180 is passed between a pair of embossing rollers 186 and 188. The embossing roller 186 has a plurality of raised portions 190 (only one of the raised portions 190 being designated as the reference numeral in FIG. 8). The embossing roller 188 has a plurality of depressed portions 192 (one of the depressed portions 192 being designated as the reference numeral in FIG. 8). The depressed portions 192 are arranged on the embossing roller 188 to correspond and register with the raised portions 190 on the embossing roller 186. An ink roller 194 is disposed near the embossing roller 186 and positioned to apply ink to the raised portions 190 of the embossing roller 186.

The sheet of material 180 is passed between the embossing rollers 186 and 188 in the direction indicated by the arrow 196 and the embossing rollers 186 and 188 are rotated in the direction indicated by the arrows 198 and 200, respectively. As the sheet of material 180 is passed between the embossing rollers 186 and 188, the raised portions 190 on the embossing roller 186 engage the sheet of material 180 and force the sheet of material 180 into the corresponding depressed portion 192 of the embossing roller 188 thereby forming raised portions 202 and depressed portions 204 in the sheet of material 180. The ink roller 194 rotates in a direction indicated by the arrow 206 and applies ink to the raised portions 190 of the embossing roller 186. The raised portions 190 of the embossing roller 186 having the ink thereon transfer the ink to the sheet of material 180 thereby applying a color or printed material to the raised portions 202 of the sheet of material 180 simultaneously with forming the raised portions 202 to provide an embossed, printed sheet of material 208 wherein the embossed pattern 174 and the printed material 176 of the embossed printed sheet of material 208 are in registry.

The term "in registry" as used herein is to be understood to mean that the embossed pattern and the printed material are positioned on the embossed, printed sheet of material in predetermined positions so that the embossed pattern and the printed material are disposed within the confines of a unitary design. For example, FIG. 9 illustrates a unitary pattern or design containing the embossed pattern 174 and the printed material 176 which are within the confines of the unitary pattern or design.

The embossed, printed sheet of material 208 is then passed through a drier 210 to produce a dried embossed printed sheet of material 212. The dried embossed printed sheet of material 212 is then passed through a slitter 214, which slits or cuts the dried embossed printed sheet of material 212 into strips or strands of desired width to produce a slitted web of material 216. The slitted web of material 216 is then passed into a chopper unit 218 where the slitted web 216 is chopped into segments 220 to produce the decorative grass 172 (FIG. 9) having a predetermined length and width and which have the embossed pattern 174 in registry with the printed material 176. It should be noted that by controlling the embossing and printing of the sheet of material 180 to produce the embossed printed sheet of material 208, as well as the slitting of the dried embossed printed sheet of material 212 by passage of same through the slitter 214, the unitary patterns or designs comprising the embossed pattern 174 in register with the printed material 176 can be controlled to lie within the boundaries of the segments 220 constituting the decorative grass 172, or the unitary patterns or designs may be randomly positioned on the sheet of material 180 so that only portions of the unitary patterns or designs lie within the boundaries of the segments constituting the decorative grass 172. The decorative grass 172 produced by passing the slitted web 216 through the chopper unit 218 can then be conveyed to a storage area (not shown) which may be in the form of a suitable bin, conveyed to a packaging machine or to a baling machine for baling prior to storage. As other alternatives, the decorative grass 172 may be placed into boxes or cartons, subjected to further processing immediately or held for subsequent processing.

The sheet of material 180 can constructed of any suitable material capable of being printed and embossed. Illustrative of material which can be employed as the sheet of material 180 are polymeric film, paper, foil, iridescent materials, optical effect materials and combinations thereof, such as laminated materials.

When the sheet of material 180 is a laminated material and only one surface of the sheet of material 180 is to be printed to produce the embossed printed sheet of material 208, only the side being printed with the printed design and/or printed material 176 must be capable of having the ink affixed thereto.

When the sheet of material 180 is a polymeric film, a flexible sheet of liquified thermoplastic film can be extruded from an extruder in a conventional and well known manner. The flexible sheet of liquified thermoplastic film can then be passed through a cooler which cools the liquified thermoplastic film into a sheet of solidified thermoplastic film, i.e. the sheet of material 180. The sheet of solidified thermoplastic film is then printed and embossed in the manner herein before discussed to provide the embossed printed sheet of material 208.

Referring now to FIG. 9, one segment 220 of the decorative grass 172 is illustrated. The segment 220 of the decorative grass 172 is provided with an upper surface 222 and a lower surface 224. The upper surface 222 is provided with the embossed pattern 174 which is in register with the printed material 176. In addition, the segment 220 has a width 226 and a length 228, each of which are determined by the processing conditions of the system 170, i.e. the operational parameters of the slitter 214 and the chopper unit 218. Further, by controlling the embossing and printing of the sheet of material 180, as well as the slitting of the dried embossed printed sheet of material 212, the segment 220 of the decorative grass 172 is provided with unitary patterns or designs comprising embossed patterns 174 in register with the printed materials 176 which lie within the boundaries of the segment 220.

The width 226, length 228 and thickness 230 of the segment 220 can vary widely and will generally be dependent on the requirements of individual consumers. For most uses, however, the segment 220 will have a width 226 of from about 0.020 inches to about 0.125 inches, a length 228 of from about 2 inches through 24 inches and a thickness 230 of from about 0.0005 inches to about 0.0030 inches.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for making a decorative grass having an appearance of a blend of different colored decorative grasses, comprising the steps of:

providing a web of material;

printing the web of material with a plurality of colored inks so as to provide a multi-colored web of material; and slitting the multi-colored web of material to provide a decorative grass wherein the decorative grass has an appearance of a blend of at least two decorative grasses of different colors.

2. A method for making a decorative grass having an appearance of a blend of different colored decorative grasses, comprising the steps of:

providing a web of material printed with a plurality of colored inks so as to provide a multi-colored web of material;

slitting the multi-colored web of material to provide a slit web of multi-colored material; and cutting the slit web of multi-colored material to provide a decorative grass comprising a plurality of segments having a predetermined width and length, the segments of decorative grass having varying colors so that the decorative grass appears to be a blend of two or more different colored decorative grasses.

3. The method for making a decorative grass of claim 2 wherein the decorative grass is provided with a thickness in the range of from about 0.0005 inches to about 0.003 inches.

4. The method for making a decorative grass of claim 2 wherein the web of material is formed of a material selected from the group consisting of polymeric film, paper, foil, iridescent material, optical effect material and laminations thereof.

5. A method for making a decorative grass having an appearance of a blend of different colored decorative grasses, comprising the steps of:

providing a web of material having an upper surface and a lower surface;

printing the upper surface of the web of material with a color of ink and printing the lower surface of the web of material with a different color of ink so as to provide a multi-colored web of material; and slitting the multi-colored web of material to provide a decorative grass wherein the decorative grass has an appearance of a blend of at least two decorative grasses of different colors.

6. A method for making a decorative grass having an appearance of a blend of different colored decorative grasses, comprising the steps of:

providing a web of material having an upper surface and a lower surface, the upper surface of the web of material printed with a colored ink and the lower surface of the web of material printed with a different colored ink so as to provide a multi-colored web of material;

slitting the multi-colored web of material to provide a slit web of multi-colored material; and cutting the slit web of multi-colored material to provide a decorative grass comprising a plurality of segments having a predetermined width and length, the segments of decorative grass having varying colors so that the decorative grass appears to be a blend of two or more different colored decorative grasses.

7. The method for making a decorative grass of claim 6 wherein the decorative grass is provided with a thickness in the range of from about 0.0005 inches to about 0.003 inches.

8. The method for making a decorative grass of claim 6 wherein the web of material is formed of a material selected from the group consisting of polymeric film, paper, foil, iridescent material, optical effect material and laminations thereof.

* * * * *